(12) United States Patent
Wauke

(10) Patent No.: US 6,239,946 B1
(45) Date of Patent: May 29, 2001

(54) MAGNETIC DISK DRIVE

(75) Inventor: Tomokuni Wauke, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/280,412

(22) Filed: Mar. 29, 1999

(30) Foreign Application Priority Data

Mar. 30, 1998 (JP) ................................................ 10-083422

(51) Int. Cl.⁷ .................................................. G11B 17/04
(52) U.S. Cl. ..................................... 360/99.06; 360/99.02
(58) Field of Search ............................. 360/99.02, 99.06, 360/99.05, 99.12; 369/75.1, 75.2, 77.1, 77.2

(56) References Cited

U.S. PATENT DOCUMENTS

| | | | |
|---|---|---|---|
| 4,831,477 | 5/1989 | Sakamoto et al. | 360/99.06 |
| 5,025,339 | * 6/1991 | Kanno et al. | 360/99.06 |
| 5,490,023 | * 2/1996 | Watanabe | 360/99.06 |
| 5,790,497 | * 8/1998 | Hayashi | 360/99.06 |

FOREIGN PATENT DOCUMENTS 64-33765 * 2/1989 (JP).
9-180342 * 7/1997 (JP).

\* cited by examiner

Primary Examiner—David L. Ometz
(74) Attorney, Agent, or Firm—Brinks Hofer Gilson & Lione

(57) ABSTRACT

A magnetic disk drive having an elastic member on any one of a cartridge holder and a slide plate, and engaging portions on the other one, in order that the elastic member engaged with the engaging portions will produce a resistance force against the force of coil springs when the slide plate is slid by the force of the coil springs.

2 Claims, 9 Drawing Sheets

PRIOR ART

MAGNETIC DISK DRIVE

BACKGROUND OF THE INVENTION

1. Field of the Invention

The present invention relates to a magnetic disk drive for recording information on, and reproducing information from, a magnetic disk and, more particularly, to a loading mechanism for moving a disk cartridge between an unloading position and a loading position.

2. Description of the Related Art

This type of magnetic disk drive uses a disk cartridge housing a magnetic disk in a casing. The disk cartridge is inserted into the magnetic disk drive and the magnetic disk is driven to store and reproduce information.

FIG. 13 is for explaining the disk cartridge to be used in this type of magnetic disk drive, in which a disk cartridge 70 houses a magnetic disk 71 in a synthetic resin casing 72.

A corner of one end of this casing 72 is cut off in a tapered shape to form an insertion error preventing portion 73. The opening 74 is formed in one end side of the casing 72, and a shutter 75 made of a thin metal plate is slidably attached along the one end edge of the casing 72.

The shutter 75 is provided with a window 76 formed correspondingly to the opening 74. The shutter 75 is being constantly pressed in the direction of the arrow g by an unillustrated spring which is built in the casing 72, closing the opening 74. When the shutter 75 slides in the opposite direction of the arrow g against the spring force, the window 76 comes into alignment with the opening 74; that is, the shutter 75 is opened, exposing out the magnetic disk 71 housed in the casing 72.

Next, FIG. 10 to FIG. 12 are for explaining the prior art magnetic disk drive. The disk drive is mainly comprised of a cartridge holder 80 for holding a disk cartridge loaded; a slide plate 81 which moves the cartridge holder 80 between the unloading position in which the disk cartridge is loaded and unloaded, and the loading position in which information is stored in, and reproduced from, the magnetic disk 71; a chassis 82 slidably supporting the slide plate 81; a carriage 84 mounted with a lower magnetic head 83b and movable in a diametral direction of the magnetic disk 71; a hold case 85 vertically movably supported in the carriage 84 and mounted with an upper magnetic head 83a; and an unillustrated spindle motor for driving to rotate the magnetic disk 71.

The slide plate 81 is made of a thin iron plate, and its both right and left ends are bent into a U shape to thereby form a pair of side walls. As shown in FIG. 10, another end of a coil spring 86 retained at its one end on the front side of the chassis 82 is retained, so that slide plate 81 is pressed towards the front side (in the direction of the arrow b) of the chassis 82, thereby being locked in this state by a lock mechanism not shown. The pair of side walls of the slide plate 81 are provided with inclined cam grooves 81a correspondingly to four projections 80a formed on both sides of the cartridge holder 80. These projections 80a are positioned above the inclined cam grooves 81a as shown in FIG. 11, to thereby support the cartridge holder 80 in the unloading position previously stated.

On the back side of the chassis 82 the carriage 84 is mounted. As shown in FIG. 11, a pair of arms 85a formed on the hold case 85 are in contact with the upper surface of the cartridge holder 80. In this state the upper magnetic head 83a is off the lower magnetic head 83b.

In this state, the disk cartridge 70, when inserted into the magnetic disk drive, is received by the cartridge holder 80, which, with the shutter 75 opened, holds the disk cartridge 70 and is released from the above-described unillustrated lock mechanism. Then the slide plate 81 slides in the direction of the arrow g by the force of the coil spring 86. With the sliding of the slide plate 81, the projection 80a moves downwardly from the upper part of the inclined cam groove 81a to the lower part of the inclined cam groove 81a as shown in FIG. 12, allowing the cartridge holder 80 to move downwardly from the unloading position to the loading position. With this movement, the magnetic disk 71 is set to the unillustrated spindle motor mentioned above and at the same time the hold case 85 tilts down to lower the upper magnetic head 83a into contact with the magnetic disk 71. That is, the magnetic disk 71 is held between the upper and lower magnetic heads 83a and 83b, being rotated to record information in, or reproduce information from, the magnetic disk 71.

To take the disk cartridge 70 out of the magnetic disk drive after the recording/reproducing of information, the slide plate 81 is slid towards the back side of the chassis 82 (in the opposite direction of the arrow b) against the force of the coil spring 86; then the projection 80a is moved upwardly from the lower part of the inclined cam groove 81a and the slide plate 81 is locked by the unillustrated lock mechanism previously stated, thus allowing the cartridge holder 80 back to the original unloading position.

With the movement of the cartridge holder 80 from the unloading position to the loading position, the upper magnetic head 83a is lowered by the force of the coil spring 86. In this case, however, the upper magnetic head 83a, if moving down abruptly, will give damage to the magnetic disk 71. It is, therefore, necessary to control the speed of downward movement of the upper magnetic head 83a.

In the magnetic disk drive, as shown in FIG. 10, a rotary oil damper 87 mounted on the chassis 82 is engaged with the slide plate 81. When the slide plate 81 slides in the direction of the arrow b with the force of the coil spring 86, a resistance force is produced by the rotary oil damper 87 against the force of the coil spring 86, reducing the speed of sliding of the slide plate 81 and consequently slowly moving the upper magnetic head 83a downwardly into gradual contact with the magnetic disk 71.

The prior art magnetic disk drive described above, however, has such a shortcoming that since the rotary oil damper 87 which reduces the speed of sliding of the slide plate 81 is expensive, the cost of the device can not be decreased.

SUMMARY OF THE INVENTION

In view of the above-described shortcoming, it is an object of the present invention to provide a magnetic disk drive which can reliably decrease the speed of sliding of the slide plate to control the speed of downward movement of the upper magnetic head. The present invention, therefore, can reduce the cost of the device.

To accomplish the object, the present invention comprises a cartridge holder which holds a disk cartridge and is transferred between the unloading position for loading and unloading of the disk cartridge and the loading position for information recording on, and reproducing from, a disk in the disk cartridge; a slide plate which is slidably mounted between the first and second positions on the chassis, positions the cartridge holder in the unloading position when in the first position, and also positions the cartridge holder in the loading position when in the second position; an actuating means to move the slide plate towards the second position; a movable head which is pressed towards the surface of the disk and comes into contact with the surface of the disk in connection with the movement of the cartridge holder to the second position; and an elastic member between the cartridge holder and the slide plate; said elastic member producing a resistance force against the force of the actuating means in a process in which the slide plate is slid from the first position to the second position by the actuating means.

In the above-described constitution, the elastic member between the cartridge holder and the slide plate is disengaged before the slide plate reaches the second position.

Furthermore, in the above-described constitution, a spindle motor is mounted to drive the disk; and a projection is provided on the cartridge holder which pushes the disk cartridge towards the spindle motor by the force of the actuating means when the cartridge holder is loaded in the loading position.

DESCRIPTION OF THE PREFERRED EMBODIMENTS

Figure 1:
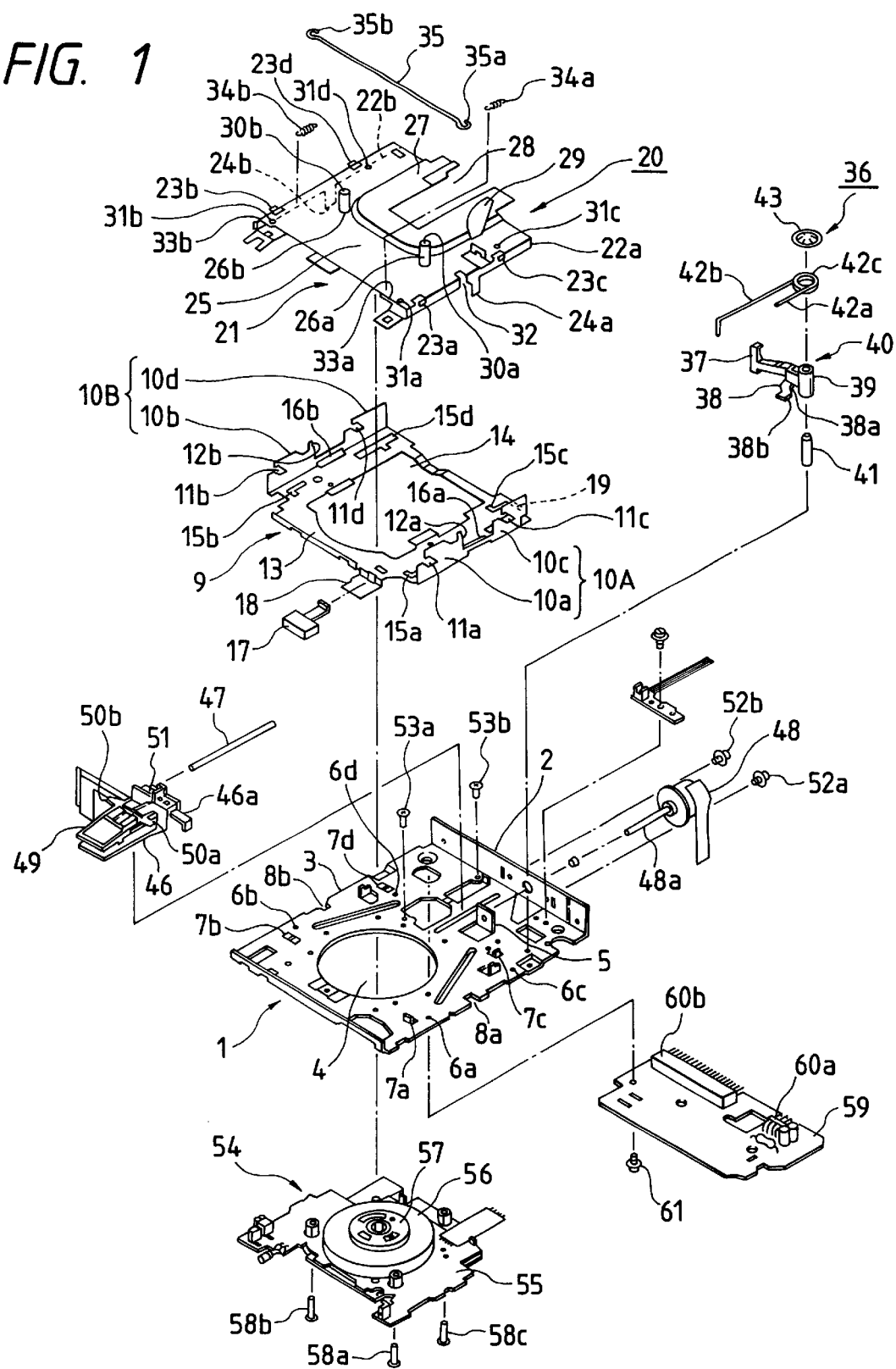
FIG. 1 is an exploded perspective view of one embodiment of a magnetic disk drive according to the present invention.

Referring to FIG. 1 to FIG. 9, preferred embodiments of a magnetic disk drive according to the present invention will be described.

The disk drive is comprised of a cartridge holder 20 for holding the disk cartridge 70 received; a slide plate 9 for moving the cartridge holder 20 between the unloading position in which the disk cartridge is removed and the loading position for recording information on, and reproducing information from, the magnetic disk 71; a chassis 1 for slidably supporting the slide plate 9; a shutter opening mechanism 36 attached on the chassis 1; a head transport mechanism 44 for moving the upper and lower magnetic heads 45a and 45b in the radial direction of the magnetic disk 71; a spindle motor 54 for driving the magnetic disk 71; and a circuit board 59 for controlling the head transport mechanism 44 and the spindle motor 54.

The chassis 1 is made of a flat iron plate, the rear end portion of which is bent vertically upwardly to form a support wall 2 as shown in FIG. 1. In the bottom 3 of the chassis 1 are formed a round opening 4 for insertion of the spindle motor 54 and a support portion 5 for supporting a rotating shaft 48a of a later-described stepping motor 48. Four projections 6a to 6d and four key type guides 7a to 7d are upwardly provided. Furthermore, a pair of cutouts 8a and 8b are formed on both the right and left sides of the bottom 3 of the chassis 1.

The slide plate 9 is also made of a thin iron plate, both the right and left end portions of which are bent vertically upwardly to form a pair of side walls 10A and 10B as shown in FIG. 1. The right side wall 10A is composed of a front side wall 10a and a rear side wall 10c. The left side wall 10B is comprised of a front side wall 10b and a rear side wall 10d. On the front side walls 10a and 10b, inclined cam grooves 11a and 11b and spring retaining portions 12a and 12b are formed. Also on the rear side walls 10c and 10d, inclined cam grooves 11c and 11d are formed. The slide plate 9 has a large opening 14 at the central part of the bottom 13, on the right side of which are formed guide holes 15a and 15c and an insertion hole 16a, and on the left side of which are formed guide holes 15b and 15d and an insertion hole 16b. Furthermore, an eject button mounting portion 18 is extendedly provided as a part to be depressed, in the vicinity of the right side wall 10A off the center of the bottom 13, in the lateral direction of the slide plate 9. Also a locking pawl 19 is formed by bending at the rear end and an eject button 17 is attached on the eject button mounting portion 18.

Figure 2:
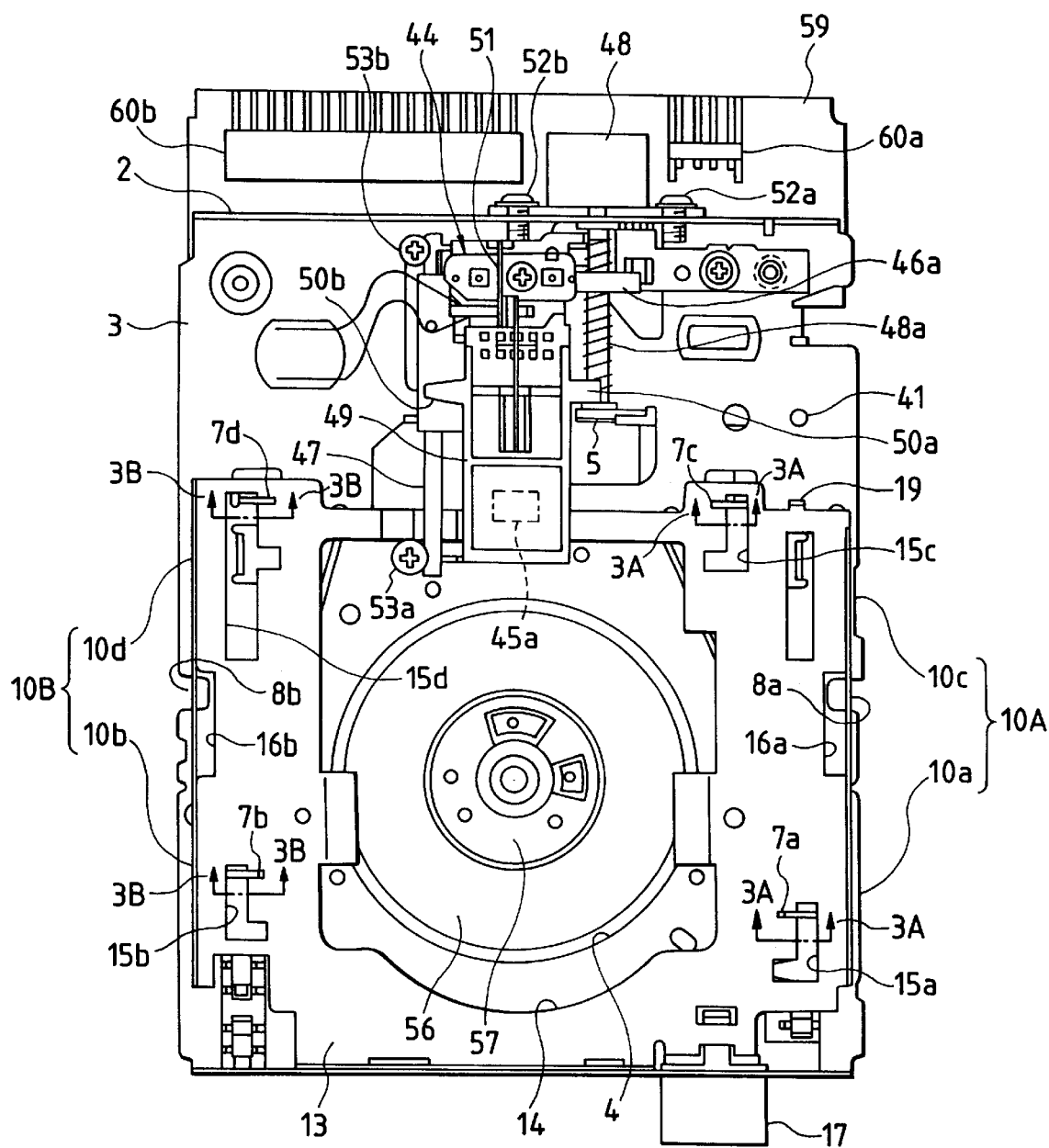
FIG. 2 is a plan view of the magnetic disk drive of FIG. 1 with a cartridge holder removed.
Figure 3A:
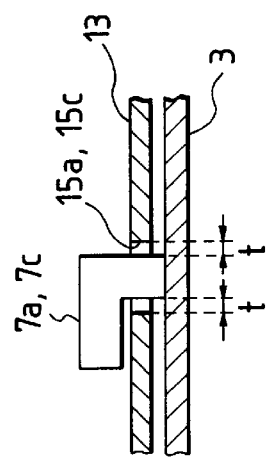
FIG. 3A and FIG. 3B are sectional views taken along lines 3A—3A and 3B—3B respectively.
Figure 3B:
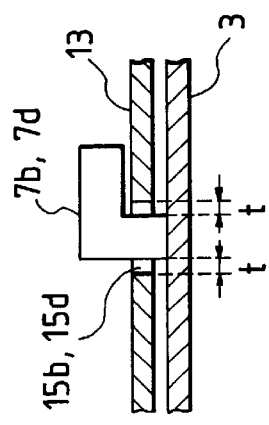

When the slide plate 9 is attached on the bottom 3 of the chassis 1, the bottom 13 of the slide plate 9 comes into contact with the projections 6a to 6d, and a slight clearance is formed between the bottom 13 of the slide plate 9 and the bottom 3 of the chassis 1 as shown in FIG. 3A and FIG. 3B. Also, as shown in FIG. 2, four guides 7a to 7d are positioned in the guide holes 15a to 15d to restrict the rise of the slide plate 9. In this state, the slide plate 9 is supported slidably along the bottom 3 of the chassis 1. Insertion holes 16a and 16b are arranged opposite to the cutouts 8a and 8b of the chassis 1. Between the guides 7a to 7d and the guide holes 15a to 15d, there is provided a slight clearance t to smoothly slide the slide plate 9 in the longitudinal direction of the chassis 1.

Figure 5:
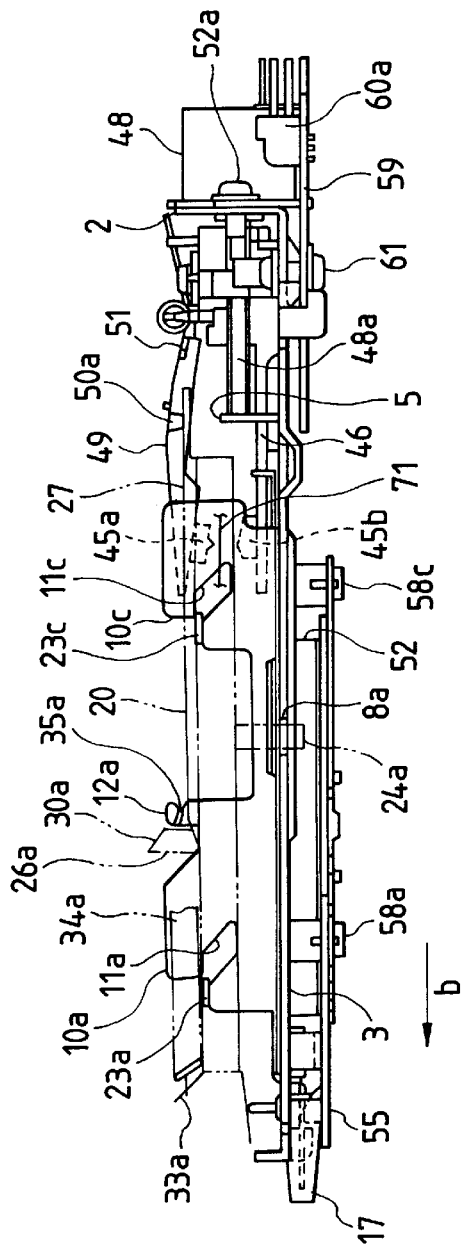
FIG. 5 is a right side view of FIG. 4.

The cartridge holder 20 is produced of a thin iron plate, both the right and left ends of which are bent into a U shape, thereby forming a cartridge insertion port 21 in the front end portion as shown in FIG. 1. Through this cartridge insertion port 21 the disk cartridge 70 is inserted and held in position. Then, on the right side surface 22a of the cartridge holder 20 a pair of projections 23a and 23c and a guide leg 24a are formed; and on the right side 22b of the cartridge holder 20 a pair of projections 23b and 23d and a guide leg 24b are formed. Furthermore, on the upper surface portion 25 of the cartridge holder 20 a pair of cylindrical engaging portions 26a and 26b are provided; and the rear part of the upper surface portion 25 is jutting out upwardly to form a bulged portion 27. In the bulged portion 27, a long hole 28 and an escape hole 29 are formed. On the top of the pair of engaging portions 26a and 26b are formed tapered portions 30a and 30b which are inclined downwardly towards the rear of the upper surface 25 as shown in FIG. 1 and FIG. 5. At four places of the upper surface 25 of the cartridge holder 20, projections 31a to 31d are formed downwardly projecting. Also a lock hole 32 is formed from the upper surface 25 to the right side surface 22a. Furthermore, on both the right and left sides of the front end of the upper surface 25 spring retaining portions 33a and 33b are extendedly provided.

Figure 4:
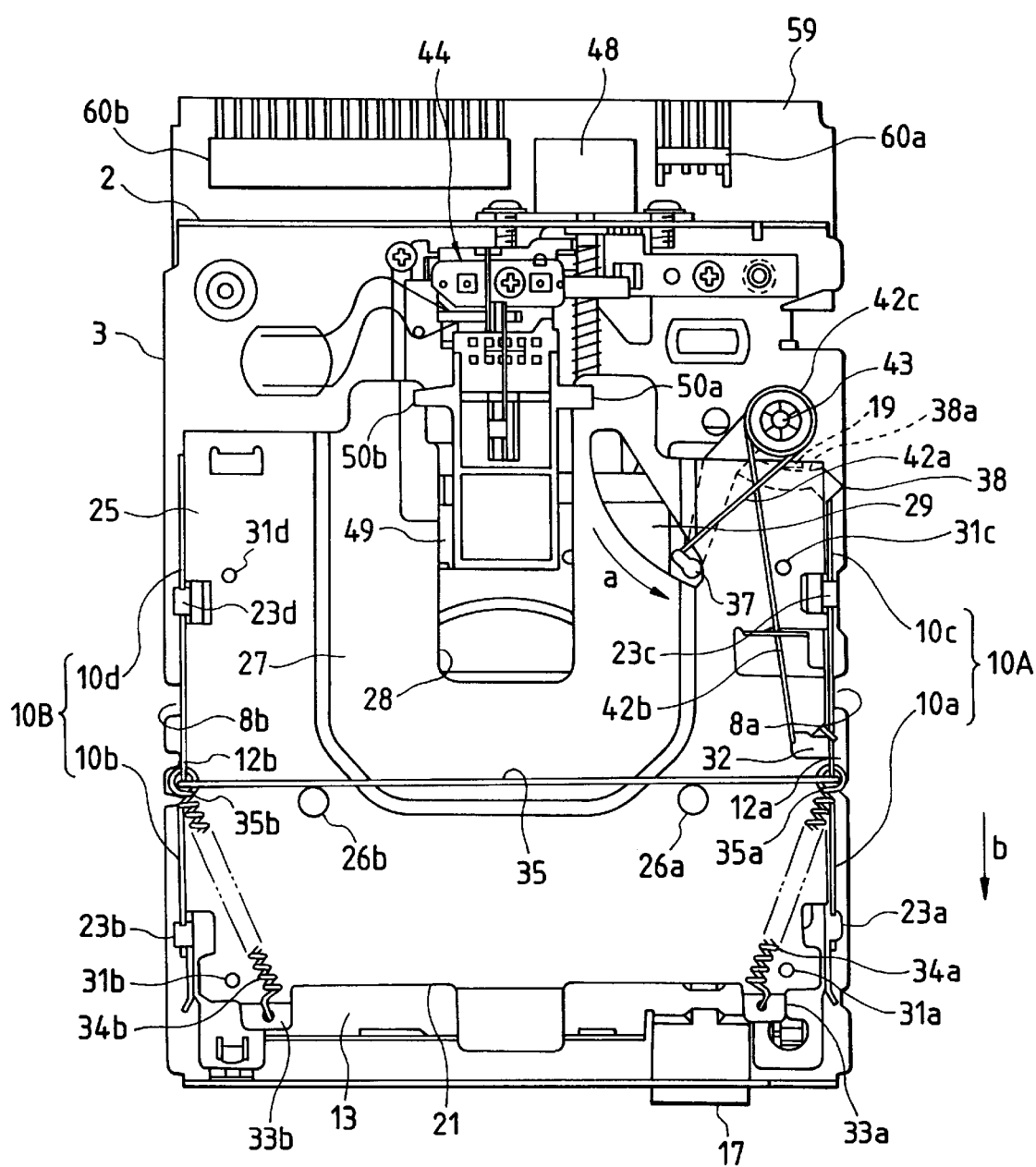
FIG. 4 is a plan view of one embodiment of the magnetic disk drive according to the present invention at the time of unloading.

The cartridge holder 20, when assembled with the slide plate 9, is inserted between the pair of side walls 10A and 10B of the slide plate 9 as shown in FIG. 4, and a pair of projections 23a and 23c on the right side surface 22a are positioned in engagement with the upper part of the inclined cam grooves 11a and 11c formed on the right side wall 10a and 10c of the slide plate 9. Thus the guide leg 24a engages with the cutout 8a of the chassis 1 through the insertion hole 16a of the slide plate 9. Similarly a pair of projections 23b and 23d on the left side surface 22b are positioned in engagement with the upper part of the inclined cam grooves 11b and 11d formed in the left side walls 10b and 10d of the slide plate 9, and the guide leg 24b engages with the cutout 8b of the chassis 1 through the insertion hole 16b of the slide plate 9, thereby positioning the cartridge holder 20 in the aforementioned unloading position. Then, with the guide legs 24a and 24b engaged with the cutouts 8a and 8b respectively, the cartridge holder 20 is restricted from moving longitudinally, that is, can move only vertically with respect to the chassis 1. Furthermore, between the spring retaining portions 12a and 12b of the slide plate 9 and the spring retaining portions 33a and 33b of the cartridge holder 20, coil springs 34a and 34b as actuating members are mounted as shown in FIG. 4, to thereby equally pressing both the right and left sides of the slide plate 9 towards the front side (in the direction of the arrow b).

The elastic member 35 is comprised of a straight coil spring, at both the right and left ends of which retained portions 35a and 35b are formed. The elastic member 35 is attached on the slide plate 9, in contact with the side surfaces of the pair of engaging portions 26a and 26b, with the retained portions 35a and 35b retained in the spring retaining portions 12a and 12b of the slide plate 9 as shown in FIG. 4.

The shutter opening mechanism 36 is comprised of a rotating member 40 integrally including a shutter opening pin 37 and a lock pawl 38, a pivot 41 mounted on the chassis 9, a torsion coil spring 42 having a pair of free ends 42a and 42b, and a retaining member 43 mounted on the top end of the pivot 41. Furthermore, in the rotating member 40 a shaft portion 39 in which the pivot 41 is inserted is formed.

When the shutter opening mechanism 36 is mounted on the chassis 1, the shaft portion 39 of the rotating member 40 and the wound portion 42c of the torsion coil spring 42 are inserted on the pivot 41 in the order of mention. In this state, the retaining member 43 is attached on the top end of the pivot 41, so that the rotating member 40 is rotatably supported on the chassis 1 and the torsion coil spring 42 is retained so as not to accidentally come off upwardly. Furthermore, as shown in FIG. 4, the lock pawl 38 engages at the circular portion 38a with the locking pawl 19 of the slide plate 9, holding the slide plate 9 in the first position against the force of the coil springs 34a and 34b. The shutter opening pin 37 protrudes out above the upper surface 25 from the escape hole 29 of the cartridge holder 20 until one free end 42a of the torsion coil spring 42 engages with the protruding portion, thereby pressing the rotating member 40 in a counterclockwise direction (in the direction of the arrow a). The other free end 42b of the torsion coil spring 42 serves as an insertion error preventing spring, the forward end of which is bent and engaged with a lock hole 32 and then inserted into the cartridge holder 20.

The head transport mechanism 44, as shown in FIGS. 1, 2, 4 and 5, is comprised of a carriage 46 mounted with a lower magnetic head 45b, a guide shaft 47 inserted in the carriage 46, a stepping motor 48 for moving the carriage 46 in the longitudinal direction of the chassis 1, and a hold case 49 rotatably supported at the rear end of the carriage 46.

On the hold case 49 a pair of arms 50a and 50b are provided on both the right and left sides and an upper magnetic head 45a is mounted in a position corresponding to the lower magnetic head 45b, and is pulled downwardly by a load spring 51 supported on the carriage 46. The carriage 46 has an L-shaped arm 46a extendedly formed. Formed on the underside of the L-shaped arm 46a is an unillustrated projection, which is engaged with a spiral screw groove formed on the rotating shaft 48a of the stepping motor 48.

When the head transport mechanism 44 is mounted on the chassis 1, the forward end of the rotating shaft 48a is supported by the support portion 5 and the stepping motor 48 is mounted by screws 52a and 52b on the support wall 2 of the chassis 1. Also the guide shaft 47 is installed by screws 53a and 53b on the bottom 3 of the chassis 1. As the rotating shaft 48a of the stepping motor 48 rotates, the rotation of the rotating shaft 48a is changed into a linear motion because of the engagement of the projection with the screw groove, and the carriage 46 is moved, in one body with the hold case 49, in the longitudinal direction of the chassis 1 along the guide shaft 47, thereby moving the upper and lower magnetic heads 45a and 45b in the radial direction of the magnetic disk 71. Furthermore, the pair of arms 50a and 50b of the hold case 49 contact the bulged portion 27 of the cartridge holder 20, being positioned within the long hole 28. Thus, as shown in FIG. 5, the upper magnetic head 45a goes away from the lower magnetic head 45b to be opened against the force of the load spring 51.

The spindle motor 54 has a rotor 56 rotatably supported on a base plate 55. Above the rotor 56 a magnetic disk 71 is loaded and held by a chucking portion 57.

The spindle motor 54 is mounted by screws 58a to 58c from below the bottom 3 of the chassis 1. When the spindle motor 54 is mounted on the bottom 3, the rotor 56 is inserted into the opening 14 of the slide plate 9 through the opening 4; in this state the chucking portion 57 is positioned over the bottom 13 of the slide plate 9.

The circuit board 59 is a phenolic resin substrate on which a printed circuit is formed for controlling the head transport mechanism 44 and the spindle motor 54. At the rear end of the upper surface thereof, connectors 60a and 60b to be connected to an external equipment are attached as shown in FIG. 1.

The circuit board 59 is attached by screws 61 from below the bottom 3 of the chassis 1. When the circuit board 59 is attached to the bottom 3, the connectors 60a and 60b are disposed to the rear of the support wall 2 of the chassis 1 as shown in FIG. 2.

Next, operation of the magnetic disk drive thus constituted will be explained. Referring to FIG. 4 in which the disk cartridge 70 is not mounted, when the disk cartridge 70 is inserted into the magnetic disk drive from its one end side, the disk cartridge 70 is guided from the cartridge insertion port 21 into the cartridge holder 20, the other free end 42b of the torsion coil spring 42 is moved to escape outwardly by means of the insertion error preventing portion 73 of the disk cartridge 70, which, therefore, comes into contact with the shutter opening pin 37. At the same time the shutter 75 engages with the shutter opening pin 37. If the disk cartridge 70 is inserted in a wrong direction, that is, with the other end not provided with the insertion error preventing portion 73, the disk cartridge 70 contacts the other free end 42b of the torsion coil spring 42, thereby preventing further insertion of the disk cartridge 70.

Figure 13:
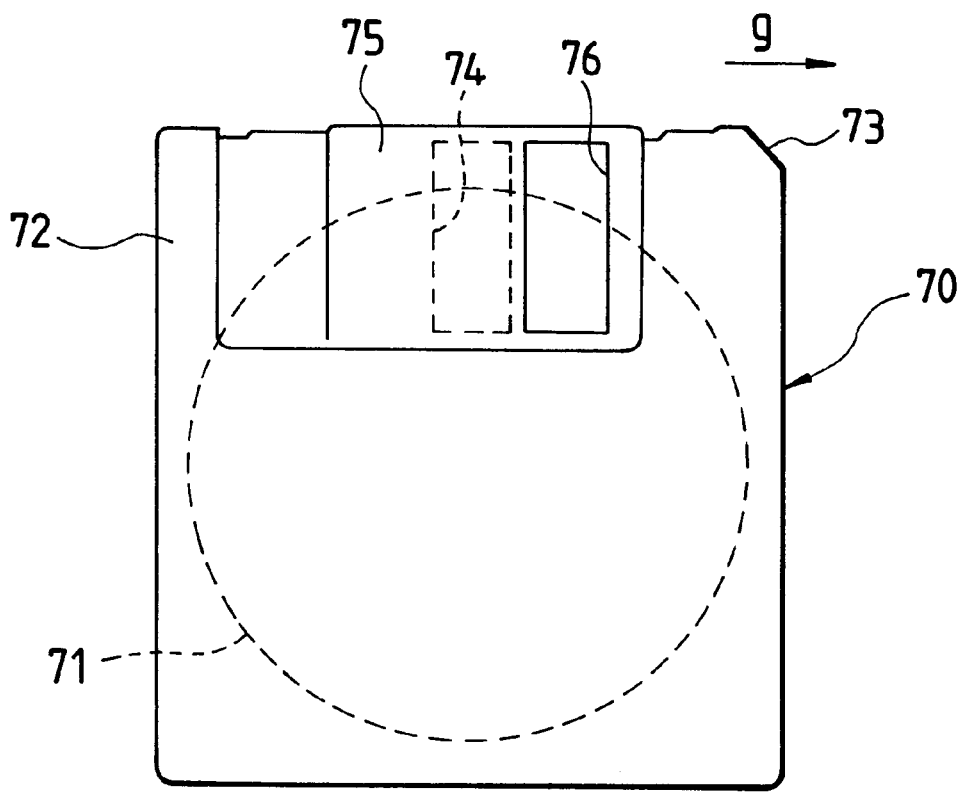
FIG. 13 is a plan view of the disk cartridge.

When the disk cartridge 70 is inserted further into the cartridge holder 20, the shutter opening pin 37 is pressed against the disk cartridge 70, turning the rotating member 40 in a clockwise direction (in an opposite direction of the arrow a) against the force of one free end 42a of the torsion coil spring 42. Thus the shutter 75 is slid by this rotation in the opposite direction of the arrow g shown in FIG. 13. When the shutter 75 is opened, the circular portion 38a of the lock pawl 38 of the rotating member 40 is disengaged from the lock pawl of the slide plate 9, which in turn is slid forwardly (in the direction of the arrow b) from the first position by the force of the coil springs 34a and 34b while the locking pawl 19 of the slide plate 9 is sliding on the straight portion 38b of the lock pawl 38. Simultaneously with the sliding motion of the slide plate 9, the elastic member 35 attached on the slide plate 9 is deflected in a circular form by engagement with the pair of engaging portions 26a and 26b of the cartridge holder 20, thereby producing a resistance force against the force of the coil springs 31a and 31b to consequently reduce the speed of sliding of the slide plate 9. The amount of deflection of the elastic member 35 reaches a maximum when the locking pawl 19 is positioned in the center of the straight portion 38b of the lock pawl 38 as shown in FIG. 6.

Then, with the guide legs 24a and 24b engaged with the cutouts 8a and 8b of the chassis 1, the cartridge holder 20 can move only vertically in relation to the chassis 1 as described above. Therefore, the slide plate 9 that has been decreased in the speed of sliding by the engagement of the elastic member 35 with the pair of engaging portions 26a and 26b slides in the direction of the arrow b; and each of the projections 23a to 23d of the cartridge holder 20 slowly moves downwardly from the upper part of the inclined cam grooves 11a to 11d. Thus the cartridge holder 20 holding the disk cartridge 70 inside gradually lowers from the loading position towards the unloading position.

With the movement of the cartridge holder 20 from the unloading position to the loading position, the hold case 49 is moved downwardly by the force of the load spring 51. Since, in this case, the pair of arms 50a and 50b of the hold case 49 are in contact with the bulged portion 27 of the cartridge holder 20, the hold case 49 also slowly lowers in interlock with the gradual movement of the cartridge holder 20.

Figure 6:
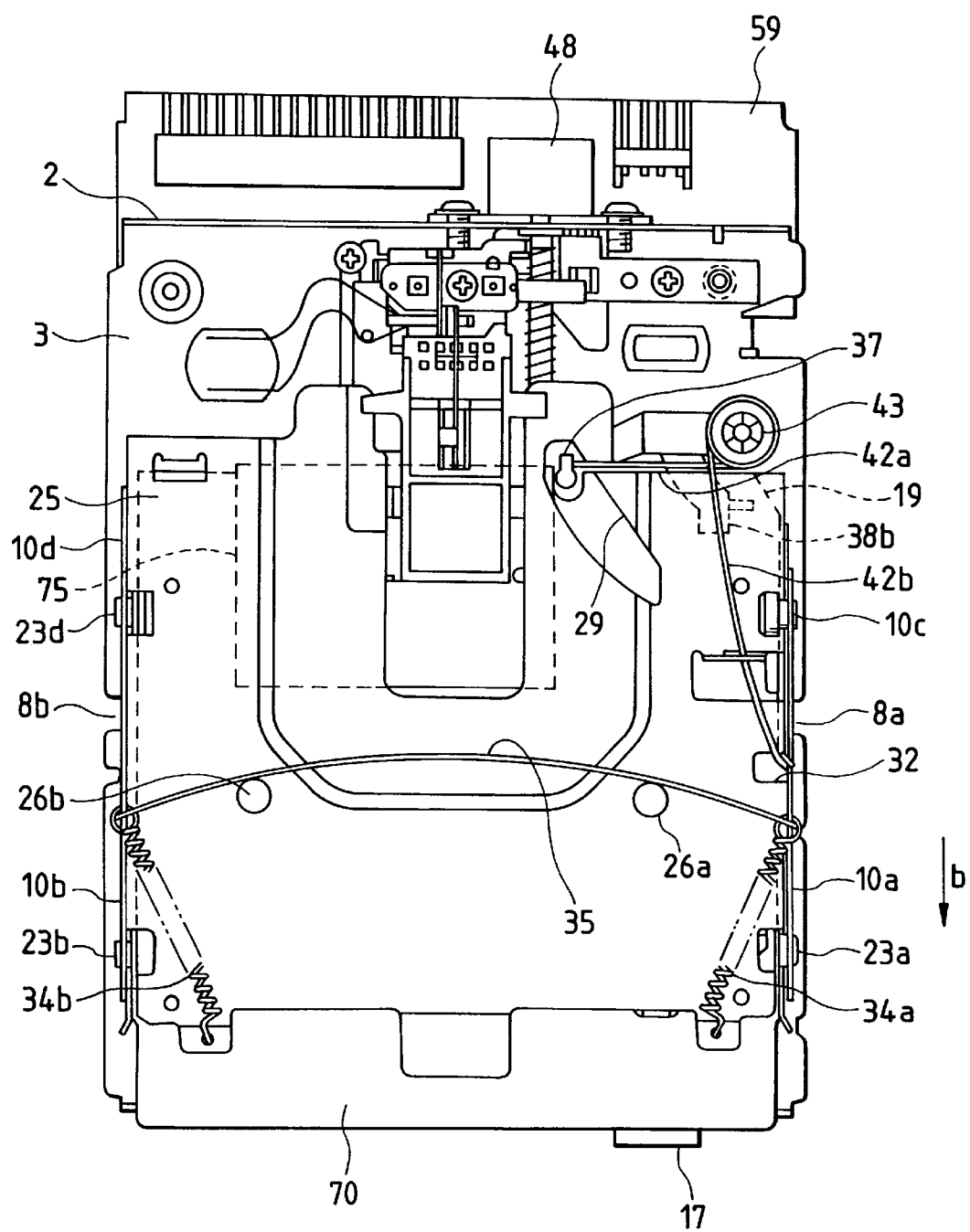
FIG. 6 is a plan view showing one embodiment of the magnetic disk drive according to the present invention operating from the unloading position to the loading position.
Figure 7:
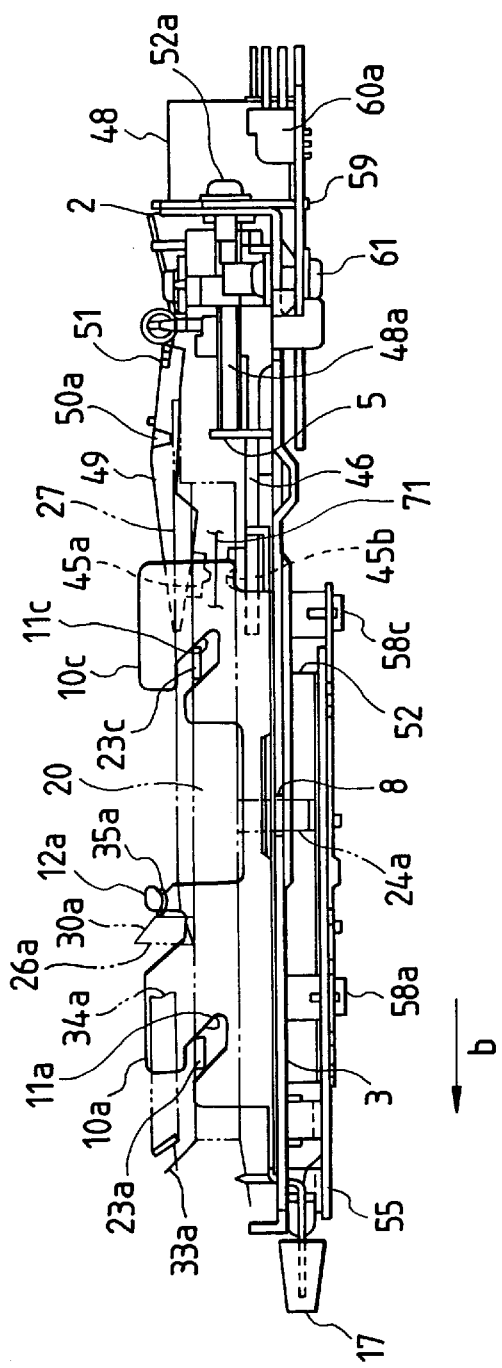
FIG. 7 is the right side view of FIG. 6.

When the locking pawl 19 has reached the position shown in FIG. 6, each of the projections 23a to 23d comes between the upper and lower parts of the inclined cam grooves 11a to 11d, and the cartridge holder 20 is positioned between the loading position and the unloading position and at the same time the elastic member 35 comes into contact at the upper end of the side surface of the engaging members 26a and 26b. In this state the upper magnetic head 45a has approached the lower magnetic head 45b.

Figure 9:
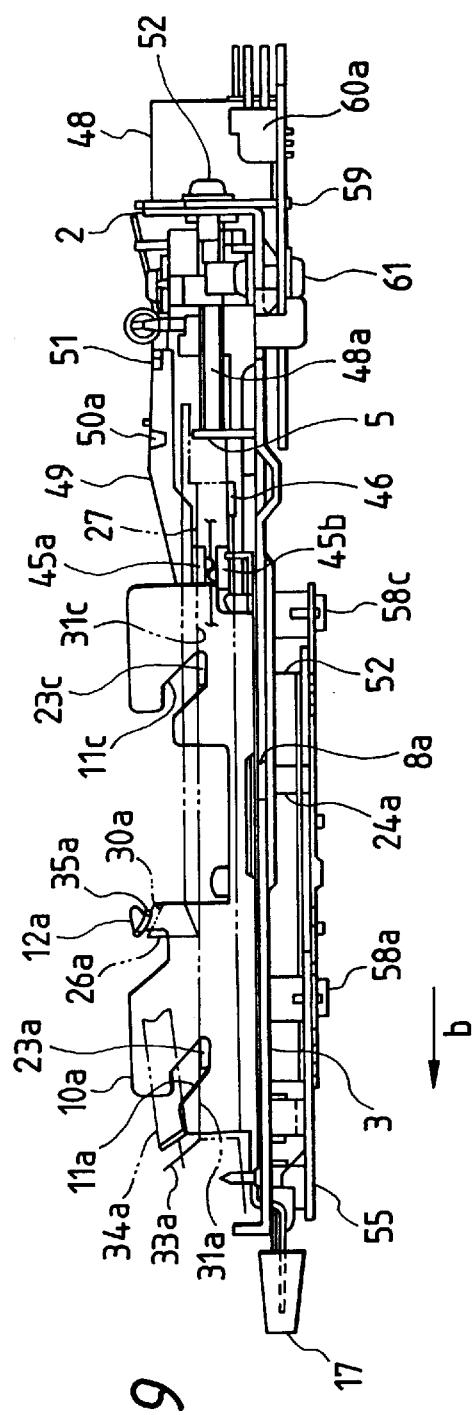
FIG. 9 is a right side view of FIG. 8.
Figure 8:
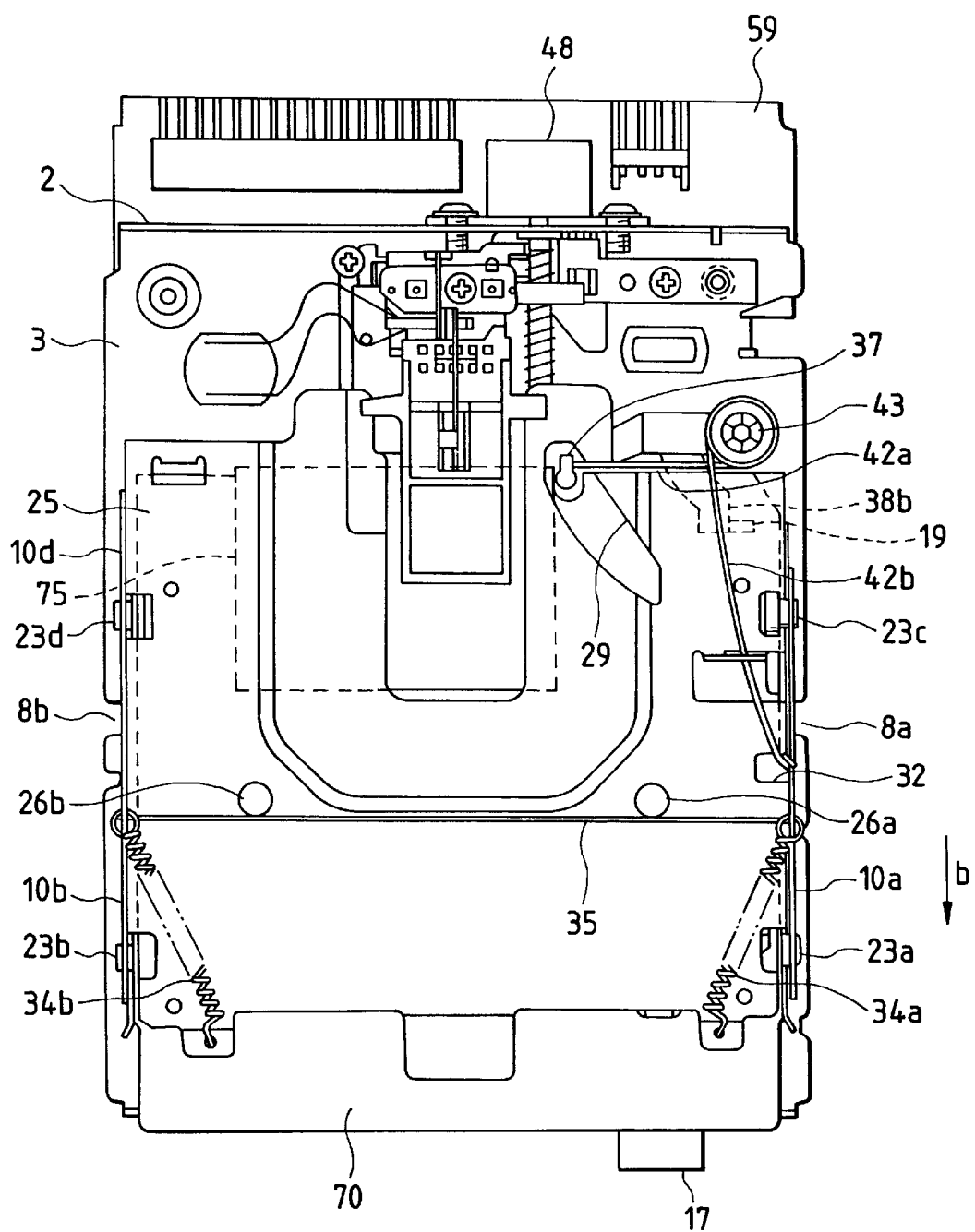
FIG. 8 is a plan view of one embodiment of the magnetic disk drive according to the present invention during loading.
Figure 10:
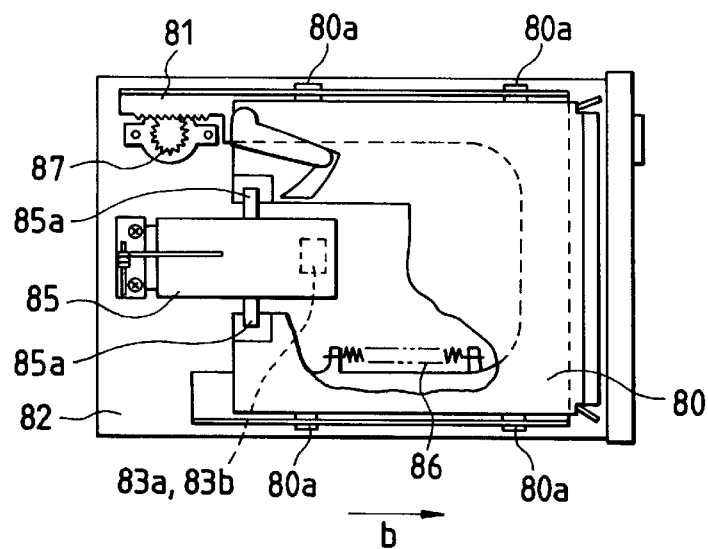
FIG. 10 is a plan view of a conventional magnetic disk drive during unloading.
Figure 11:
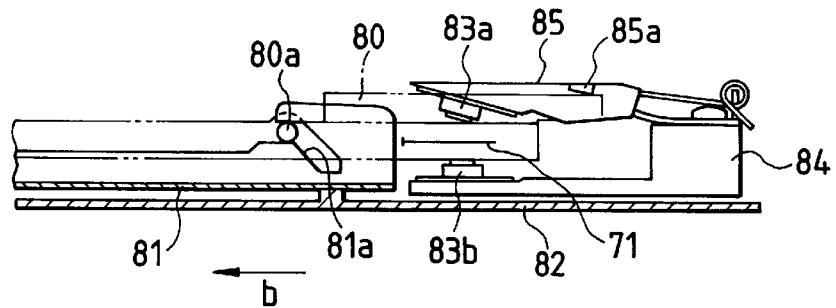
FIG. 11 is a right side view of the conventional magnetic disk drive during unloading.
Figure 12:
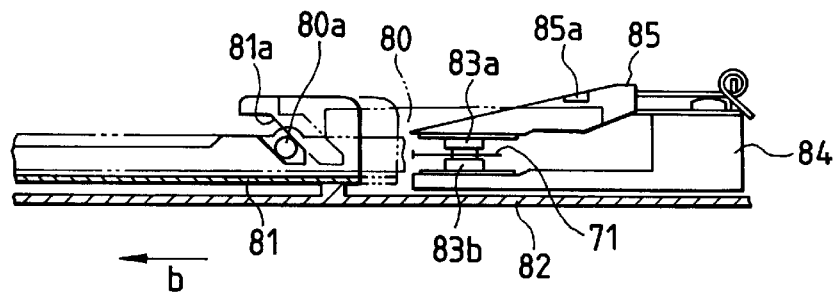
FIG. 12 is a right side view of the conventional magnetic disk drive during loading.

Furthermore, the force of the coil springs 34a and 34b overcomes the resistance force of the elastic member 35, thereby allowing the slide plate 9 to slide forwardly (in the direction of the arrow b) Each of the projections 23a to 23d of the cartridge holder 20, therefore, moves further towards the lower part of the inclined cam grooves 11a to lid to lower the cartridge holder 20 and the elastic member 35 is smoothly disengaged from the engaging members 26a and 26b by the tapered portion 30a and 30b formed at the top of the engaging portions 26a and 26b. The elastic member 35, therefore, smoothly moves from the lower end towards the upper end while sliding on the tapered portion 30a and 30b of the engaging members 26a and 26b along with the sliding motion of the slide plate 9, thereby removing the resistance force of the elastic member 35. Then, the cartridge holder 20 holds the disk cartridge 70 inside. In this state, the cartridge holder 20 rapidly lowers as far as the loading position. In connection with this movement, the hold case 49 also rapidly lowers. Consequently, the cartridge holder 20 is secured in the loading position by the force of the coil springs 34a and 34b and the disk cartridge 70 is pressed towards the spindle motor 54 by means of the projections 31a to 31d. The magnetic disk 71, therefore, is loaded on the chucking portion 57 of the spindle motor 54, and, as shown in FIG. 8, the locking pawl 19 is positioned at the end of the straight portion 38b of the lock pawl 38. Thus the slide plate 9 reaches the second position, and the elastic member 35 restores the original straight state. At the same time, as shown in FIG. 9, the upper magnetic head 45a comes into contact with the magnetic disk 71 and the engaging portions 26a and 26b are positioned below and off the elastic member 35. With the magnetic disk 71 held between the upper and lower magnetic heads 45a and 45b, the spindle motor 54 rotates the magnetic disk 71 and the stepping motor 48 moves the upper and lower magnetic heads 45a and 45b to desired positions of the magnetic disk 71. Then the upper and lower magnetic heads 45a and 45b records information on, and reproduces information from, the magnetic disk 71.

When the disk cartridge 70 is to be taken out from the magnetic disk drive after completion of information recording or reproducing, the eject button 17 is depressed to slide the slide plate 9 from the second position to the rear of the chassis 1 (in the opposite direction of the arrow b) against the force of the coil springs 34a and 34b. At this time the elastic member 35 moves towards the rear of the chassis 1 together with the slide plate 9, and each of the projections 23a to 23d of the cartridge holder 20 is moved from the lower part to the upper part of the inclined cam grooves 11a to 11d, and, with the disk cartridge 70 held inside, the cartridge holder 20 moves upwardly from the loading position back to the original unloading position. In the process of this upward movement of the cartridge holder 20, the elastic member 35 smoothly engages with the engaging members 26a and 26b at the tapered portions 30a and 30b, and smoothly slides downwardly from the upper end towards the lower end on the tapered portions 30a and 30b, engaging again with the side surface of the engaging members 26a and 26b. Then, the rotating member 40 is turned counterclockwise (in the direction of the arrow a) by the force of one free end 42a of the torsion coil spring 42 which is engaged with the shutter opening pin 37, thereby engaging the circular portion 38a of the lock pawl 38 again with the locking pawl 19 of the slide plate 9. The slide plate 9 is thus held in the first position against the force of the coil springs 34a and 34b.

With the movement of the cartridge holder 20 from the loading position to the unloading position, the pair of arms 50a and 50b of the hold case 49 move into contact with the bulged portion 27 of the cartridge holder 20, raising the hold case 49 against the force of the load spring 51 to thereby move the upper magnetic head 45a apart from the lower magnetic head 45b. At the same time, the elastic member 35 is reset into contact with the side surface of the engaging portions 26a and 26b of the cartridge holder 20. Also as the rotating member 40 is rotated by the force of the torsion coil spring 42 stated above, the shutter opening pin 37 discharges the disk cartridge 70 from the cartridge holder 20 and out of the disk drive.

In the magnetic disk drive thus constituted, the locking pawl 19 of the slide plate 9 engages with the circular portion 38a of the lock pawl 38, thus holding the slide plate 9 in the first position against the force of the coil springs 34a and 34b. From this state the locking pawl 19 comes to the end of the straight portion 38b of the lock pawl 38 and the slide plate 9 reaches the second position. In this process, the resistance force of the elastic member 35 acts against the coil springs 34a and 34b when the coil springs 34a and 34b are extended to the fullest at which their force reaches a maximum, thereby decreasing the speed of movement of the slide plate 9 and accordingly reliably reducing the speed of movement of the cartridge holder 20 from the unloading position to the loading position. Consequently, it is possible to gently lower the upper magnetic head 45a mounted on the hold case 49, into contact with the magnetic disk 71.

The resistance force of the elastic member 35 is removed before the locking pawl 19 of the slide plate 9 reaches the second position. Since the slide plate 9 reaches the second position after the removal of the resistance force of the elastic member 35, the upper magnetic head 45a can be brought smoothly and quickly into contact with the magnetic disk 71 without excessively reducing the speed of movement of the cartridge holder 20 from the unloading position to the loading position. Accordingly no much time is needed for loading the disk cartridge 70, that is, from insertion into the device until recording/reproducing.

Furthermore, the casing 72 of the disk cartridge 70, if warped, will interfere with the magnetic disk 71, disturbing rotation of the magnetic disk 71. When the cartridge holder 20 is in the loading position, the engaging portions 26a and 26b of the cartridge holder 20 is free from the resistance force of the elastic member 35 and not engaged with the elastic member 35; in this state the cartridge holder 20 is held in the loading position by the force of the coil springs 34a and 34b. Then, the projections 31a to 31d of the cartridge holder 20 push the disk cartridge 70 towards the spindle motor 54 side by the use of the force of the coil springs 34a and 34b. Therefore, it is possible to properly correct the deflection of the casing 72 without decreasing the resistance force of the elastic member 35 by a force applied by the projections 31a to 31d, consequently enabling smooth rotation of the magnetic disk 71.

The force applied by the projection 31 is not affected by the resistance force of the elastic member 35, and therefore can easily be determined by setting only the force of the coil springs 34a and 34b.

What is claimed is:

1. A magnetic disk drive, comprising:

a cartridge holder which is for holding a disk cartridge and is transported between an unloading position in which said disk cartridge is loaded and unloaded and a loading position in which information is recorded on, and reproduced from, a disk in said disk cartridge;

a slide plate slidable between first and second positions on a chassis, for positioning said cartridge holder in said unloading position in said first position, and for positioning said cartridge holder in said loading position in said second position;

an actuating means for moving said slide plate to said second position;

a movable head which is pushed towards the surface of said disk and comes into contact with the surface of said disk in interlock with the movement of said cartridge holder to said second position;

an elastic member engaged between said cartridge holder and said slide plate;

said elastic member being adapted to produce a resistance force against the force of said actuating means in a process of sliding said slide plate from said first position to said second position by said actuating means; and said elastic member is disengaged from between said cartridge holder and said slide plate before said slide plate reaches said second position.

2. A magnetic disk drive according to claim 1, wherein a spindle motor is mounted to drive said disk, and a projection is provided on said cartridge holder, for pushing said disk cartridge towards a spindle motor side by the force of said actuating means when said cartridge holder has reached said loading position.

* * * * *